US008774994B2

(12) United States Patent
Young et al.

(10) Patent No.: US 8,774,994 B2
(45) Date of Patent: *Jul. 8, 2014

(54) SYSTEM AND METHOD FOR VEHICLE PERFORMANCE CONTROL

(75) Inventors: Henry Todd Young, North East, PA (US); Ajith Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 726 days.

This patent is subject to a terminal disclaimer.

(21) Appl. No.: 12/503,466

(22) Filed: Jul. 15, 2009

(65) Prior Publication Data

US 2011/0015807 A1     Jan. 20, 2011

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |

(52) U.S. Cl.
USPC ............... 701/22; 701/93; 701/96; 180/170

(58) Field of Classification Search
USPC .......... 701/22, 1, 103, 117, 124, 19, 2, 20, 24, 701/31.4, 36, 50, 65, 93, 18, 70, 119, 96; 702/174, 181, 29, 61; 340/679; 455/557; 705/28, 305, 400, 7.21, 7.26, 705/7.36, 7.38; 180/69.3, 171, 170
See application file for complete search history.

(56) References Cited

U.S. PATENT DOCUMENTS

| | | | | |
|---|---|---|---|---|
| 4,495,449 | A | * | 1/1985 | Black et al. ................... 318/60 |
| 5,070,959 | A | * | 12/1991 | Grabowski .................. 180/167 |
| 5,448,479 | A | * | 9/1995 | Kemner et al. ................ 701/23 |
| 5,777,451 | A | | 7/1998 | Kobayashi et al. |
| 6,167,343 | A | | 12/2000 | Bauerle |
| 6,425,370 | B1 | | 7/2002 | Kramer |
| 6,601,013 | B2 | * | 7/2003 | Lueschow et al. ........... 702/175 |
| 6,721,680 | B2 | * | 4/2004 | Sorrells et al. ............... 702/174 |
| 7,005,819 | B2 | | 2/2006 | Takai |
| 7,034,476 | B2 | * | 4/2006 | Wang et al. .................. 318/139 |
| 7,058,502 | B2 | | 6/2006 | Rodgers |
| 7,137,344 | B2 | * | 11/2006 | Kumar et al. .................. 105/35 |
| 7,235,937 | B2 | | 6/2007 | Takai et al. |
| 7,242,311 | B2 | * | 7/2007 | Hoff et al. ..................... 340/679 |
| 7,285,926 | B2 | | 10/2007 | McGarry et al. |

(Continued)

FOREIGN PATENT DOCUMENTS

EP     1348851 A1     10/2003

OTHER PUBLICATIONS

PCT/US2010/038775, International Search Report and Written Opinion, Dec. 20, 2010.

*Primary Examiner* — Tuan C. To
*Assistant Examiner* — Isaac Smith
(74) *Attorney, Agent, or Firm* — GE Global Patent Operation; John A. Kramer

(57) ABSTRACT

A method is provided for controlling a drivetrain of a vehicle which includes a prime mover operatively connected to at least one tractive element. The method includes: (a) determining the vehicle's total weight; and (b) using an electronic controller carried by the vehicle, causing the prime mover to apply power to the tractive element so as to propel the vehicle, the magnitude of the power being a function of the vehicle's total weight.

20 Claims, 2 Drawing Sheets

(56) References Cited

U.S. PATENT DOCUMENTS

| | | |
|---|---|---|
| 7,308,352 B2 * | 12/2007 | Wang et al. ............. 701/70 |
| 7,532,960 B2 | 5/2009 | Kumar |
| 8,103,438 B2 * | 1/2012 | Petrie et al. ............ 701/119 |
| 8,285,456 B2 * | 10/2012 | Jensen ................... 701/48 |
| 2003/0151381 A1 | 8/2003 | Kadota et al. |
| 2003/0168272 A1 * | 9/2003 | Ono et al. .............. 180/170 |
| 2003/0220729 A1 | 11/2003 | Doddek et al. |
| 2005/0062449 A1 | 3/2005 | Wang et al. |
| 2006/0020383 A1 * | 1/2006 | Betz et al. ............. 701/50 |
| 2007/0203634 A1 | 8/2007 | Dort |
| 2007/0251740 A1 * | 11/2007 | Betz et al. ............. 180/65.1 |
| 2009/0037047 A1 * | 2/2009 | Hawkins et al. ........ 701/36 |

* cited by examiner

SYSTEM AND METHOD FOR VEHICLE PERFORMANCE CONTROL

BACKGROUND OF THE INVENTION

This invention relates generally to motorized vehicles, and more particularly to drive system performance control in such vehicles.

Off-highway vehicles, such as mining trucks, are typically provided with a drivetrain in which an internal combustion engine drives a generator that provides electrical current to one or more traction motors. Off highway vehicles typically also utilize dynamic or electric braking (referred to interchangeably herein as "retard effort"), in addition to hydraulically or mechanically operated service friction brakes.

Conventionally, mining trucks run at maximum available power up a grade, However, payload varies significantly from trip to trip, resulting in large variances in on-grade truck speed. This variance tends to cause a line of trucks to bunch up behind the truck with the heaviest load.

In conventional mining trucks, wheel torque is limited to a fixed value which will give acceptable gear life over the overhaul cycle. With limited torque available, a mining truck with a heavy load can also become stuck. A stuck truck is expensive for a mine, as it must be pulled out with a bulldozer, or have its load dumped so the truck can be driven out empty. In either case there is lost production.

Conventionally, the maximum dynamic braking effort is set to a predefined curve as a function of speed. For a specific grade and payload combination there is a maximum speed that the operator can drive and still maintain control of truck speed using only retard effort. This is known as the retard envelope. Once the truck exceeds the retard envelope the driver must use friction brakes to slow the truck back into the retard envelope. On many trucks the friction brakes are dry disks and have limited number of applications. The driver must keep vehicle speed well within the retard envelope to ensure he can maintain control of the vehicle. This limits downhill speed and cycle time.

BRIEF SUMMARY OF THE INVENTION

These and other shortcomings of the prior art are addressed by the present invention, which provides a system and method for dynamically controlling the propulsion and braking systems limits of a vehicle.

According to one aspect of the invention, a method is provided for controlling a drivetrain of a vehicle which includes a prime mover operatively connected to at least one tractive element. The method includes: (a) determining the vehicle's total weight; and (b) using an electronic controller carried by the vehicle, causing the prime mover to apply power to the tractive element so as to propel the vehicle, the magnitude of the power being a function of the vehicle's total weight.

According to another aspect of the invention, a method is provided for controlling operation of a drivetrain of a vehicle which includes at least one tractive element coupled to an electric traction motor, at least one electric energy absorbing device coupled to the traction motor, and at least one power source driven by a prime mover and coupled to the traction motor. The method includes: (a) using an electronic controller, causing the traction motor to apply a predetermined baseline retarding force to the tractive element, and coupling the traction motor to the electric energy absorbing device so as to dissipate the current generated thereby; (b) using the electronic controller, determining the vehicle's speed with reference to a retard envelope; (c) in response to the vehicle speed exceeding the boundaries of the retard envelope, applying an increased retarding force to the tractive element; and (d) when the vehicle's speed has returned to the boundaries of the retard envelope, reducing the retarding force to the baseline.

According to another aspect of the invention, a system for controlling a drivetrain of a vehicle includes: (a) a prime mover coupled to a power source; (b) at least one electric traction motor electrically coupled to the power source, the traction motor coupled to at least one tractive element; and (c) an electronic controller operably connected to the traction motor, the controller configured to: (i) determine the vehicle's total weight; (ii) cause the traction motor to apply power to the tractive element so as to propel the vehicle, the magnitude of the power application being proportional to the vehicle's total weight.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
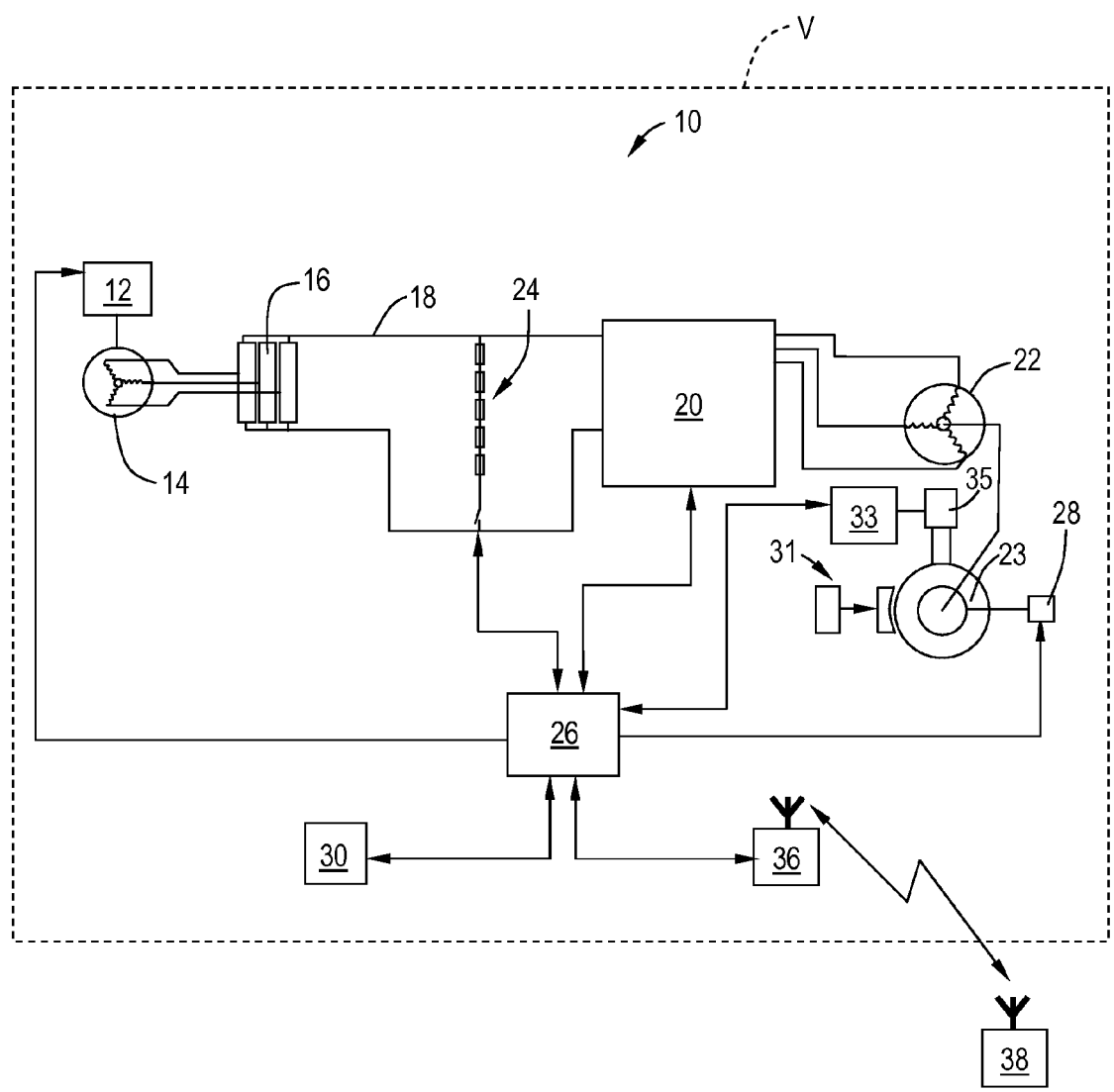
FIG. 1 is a block diagram of a drive system for a vehicle constructed in accordance with an aspect of the present invention.

Referring to the drawings wherein identical reference numerals denote the same elements throughout the various views, FIG. 1 depicts an exemplary drive system 10 for use in a vehicle "V". The drive system 10 includes a prime mover 12. In the illustrated example the prime mover 12 is a Diesel engine, and the term "engine" may be used interchangeably with the term "prime mover" throughout the remainder of this description. The prime mover 12 drives an alternator 14. The output of the alternator 14 is converted into DC via a rectifier bank 16. The DC power is provided over a DC bus 18 to an inverter unit 20. The inverter unit 20 includes DC-to-AC conversion circuitry of a known type, and also employs components such as Insulated Gate Bipolar Transistors (IGBTs) or thyristors operating as pulse width modulators (not shown) to provide a AC power to a traction motor 22 which is coupled to a wheel 23 through a known type of reduction gear (not separately shown). For the sake of illustrative simplicity, only one inverter unit 20 and traction motor 22 are shown, with the understanding that the vehicle V may be provided with multiple traction motors 22 driven by multiple inverter units 20.

While an AC-DC-AC system is described herein, is should be noted that the principles of the present invention may be applied to other drivetrain configurations, e.g. using an alternator or DC generator as a power source, and using AC or DC traction motors. Furthermore, the principles of the present invention are also applicable to other types of vehicles, such as rail vehicles or road vehicles. The vehicle V may use any type of element adapted to exert a tractive force. Examples of tractive elements include wheels, axles, or translating or reciprocating structures. The term "traction motor" could encompass, for example, electric or hydraulic linear motors or actuators.

One or more chains of grid resistors 24 are connected across the DC bus 18. The grid resistors 24 may be selectively coupled to the DC bus 18 to dissipate power generated by the traction motor 22 and thereby provide dynamic braking. This is referred to as a "retard" function. Other electrical energy absorbing devices may be used in place of the grid resistors 24 to dissipate and/or use the power generated, for example batteries, a regenerative system, or equipment to use the power like auxiliary systems and accessories.

The vehicle V includes at least one braking device 31 of a known type. The braking device 31 may be a service, parking, or emergency brake, and may be hydraulically, mechanically, or electrically operated. Most typically, the vehicle V would include a service brake system plus an emergency or parking brake system.

A microprocessor-based controller 26 has operative connections to the engine 12, the grid resistors 24, the inverter unit 20, and to numerous sensors within the drive train, such as a wheel speed sensor 28 of a known type coupled to the wheel 23. Among other functions, the controller 26 has the capability to control the speed of the engine 12, to command the inverter unit 20 to apply current to drive the traction motor 22 in a forward or reverse direction, to modulate the current level supplied to the traction motor 22, and to connect the traction motor 22 to the grid resistors 24 through the inverter unit 20 to effect the retarder function. In addition to the various discrete sensors, the controller 26 is provided with feedback from the inverter unit 20 which is indicative of the magnitude of the torque being applied to the traction motor 22. The controller 26 is also provided with means (i.e. a load cell) for determining the weight of a payload carried by the vehicle V. For example, the vehicle V may include a payload meter 33 of a known type which computes total vehicle weight based on sensed air pressure in the vehicle's suspension struts 35. The payload meter 33 can communicate the total vehicle weight to the controller 26 over a communications channel such as a serial bus.

Figure 2:
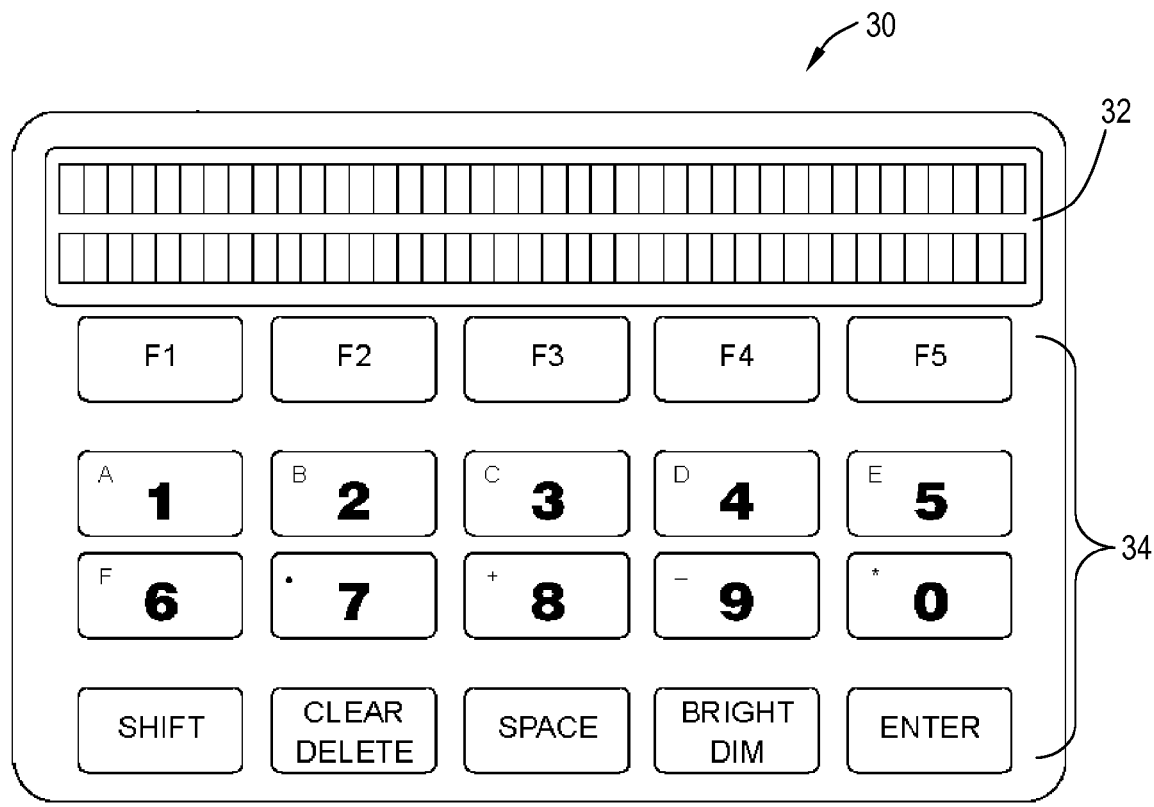
FIG. 2 is a schematic view of a driver control panel of the drive system of FIG. 1.

A control panel 30, also referred to as a "driver information display" is coupled to the controller 26. As shown in FIG. 2, the control panel 30 includes a display 32 for presenting information to the driver, and one or more controls 34 for operating the vehicle V. In the illustrated example the display 32 is a multi-line LED, and the controls 34 are configured as a plurality of fixed and configurable keys. It will be understood that the control panel 30 could be configured differently, for example it could take the form of a touch screen interface. In addition to the control panel 30 the vehicle V also includes one or more discrete vehicle controls operatively coupled to the controller 26, such as accelerator pedal (not shown).

Optionally, the controller 26 may include means for two-way communication with a remote operator or dispatcher (see FIG. 1, shown schematically at 38). As illustrated the controller 26 is coupled to a transceiver 36 which communicates with the dispatcher 28 through a wireless link.

The operation of the drive system 10 according to one aspect of the present invention will now be explained in more detail. In a regular driving mode in which traction motor torque is used to move the vehicle V, referred to as a "propel" mode, the controller 26 operates the vehicle to maintain one or more power targets which are a function of the vehicle's weight. An example of a power target would be a specific power loading, for example expressed as power output per ton. Another example would be vehicle speed, since the vehicle's speed is determined by its mass, rolling resistance, and the applied tractive force.

As an example, a known type of mining truck has an empty weight of about 175 mt (193 tons), with an a Diesel internal combustion engine 12 rated at about 2013 kW (2700 hp) and a maximum payload capacity of about 218 mt (240 tons). When the operator depresses the accelerator pedal or otherwise commands vehicle movement, the controller 26 adjusts the load on the engine 12. A separate engine controller (not shown) incorporated with the engine 12 adjusts fuel flow to the engine 12 to maintain a governed RPM under load. The result is that the engine's output equals a power loading target which is below the maximum available power. As an example, the target could be about 5.1 kW/mt (6.2 hp/ton). This would require about 1892 kW (2536 hp), or about 94% of maximum power if the payload is about 90% of capacity. Alternatively, a target speed could be used, with the target speed selected being substantially below the maximum speed achievable at maximum engine output for a particular baseline grade and payload.

The power target is "flat-rated" by a desired amount so that vehicle performance is substantially equalized over a wide range. In this example, the target power loading of about 5.1 kW/mt (6.2 hp/ton) is equal to the loading at maximum payload capacity and thus could be maintained, if desired, over the entire payload range of the vehicle V. The power target is a trade-off. A power target (speed or power loading) that represents higher engine output gives better acceleration and speed, while a lower power target gives better consistency and also enables the desired performance to be maintained over a wider range of payload conditions.

The specific process used for control is not critical and may be carried out by direct feedback control of vehicle speed, by using engine RPM as a proxy for power output, or by computation of actual torque and/or power using signals from the inverter unit 20 or voltage and current measurements from the DC bus 18. If the driver command for power output is less than the power target (for example in reversing or in low-speed maneuvering), then the supplied power would be equal to that commanded. The power target may be programmed in the controller 26 in various ways. For example, the power target could be manually entered into the control panel 30 by the driver. Alternatively, the power target could be transmitted to the vehicle V by the dispatcher 38.

In addition to variations in loading conditions, the power target is also useful in accommodating variations in vehicle performance. For example, even when new, engines typically exhibit a +/−2% variation in performance. As the vehicles 10 are used and age, there may be substantial differences in performance from vehicle to vehicle. The power target can be used to limit multiple vehicles 10 to the performance of the weakest vehicle V in the group. For example, if a sequence of vehicles 10 about to make a trip is known, along with each vehicle's total weight and maximum power, the dispatcher 38 may compute and assign a power target to each vehicle V, where the power targets are calculated to obtain substantially equal speeds from each vehicle, and thereby prevent bunching of the group of vehicles. The power target would then be transmitted to each vehicle V.

The drive system 10 incorporates limits on the maximum torque output. Consistent with the prior art, this is done by limiting current flow to the traction motors 22. Ordinarily, the maximum output will be set so as to provide acceptable overhaul life and margin against breakage of components such as the reduction gears. It is desirable to exceed these limits occasionally, for example if the vehicle V should become stuck because of overloading or soft terrain. At low speeds, for example less than about 5.1 km/h (3.2 mph) for the vehicle described above, additional power is available from the engine 12. Accordingly, the controller 26 may be used to provide the vehicle with a temporary torque boost when necessary. When such a boost is required, the controller 26 commands the drive system 10 to temporarily provide extra torque to the wheels 23, by commanding the inverter 20 to increase its output.

The torque boost may be triggered by the driver, for example by entering one or more commands in the control panel 30. A code or other security measure may be used to prevent unauthorized requests. Alternatively, a command to implement the torque boost may be transmitted from the dispatcher 38 to the controller 26 when boost is desired.

The boost usage may be limited in various ways to ensure that drive system life is not adversely affected. For example, the boost could be limited by amount of time per boost application, minimum time between applications, maximum torque increase, total number of applications per day or per operating hour, or per overhaul cycle. It could also be limited to usage at specific times or geographic areas, or to when the vehicle payload exceeds a predetermined limit. The controller 26 may store a data record of when, how long, and/or to what degree the torque boost is used. This information may be used to adjust vehicle usage fees or maintenance fees, based on utilization.

The grid resistors 24 and associated hardware (also referred to as the "retard system") have defined continuous heat rejection limits, expressed in kW or BTU/Hr. Given these limits, for a specific grade and payload there is a maximum speed that the vehicle V can be driven and still maintain control of vehicle speed using only dynamic braking (referred to interchangeably herein as "retard effort"). When the maximum speeds are mapped out for all grade and payload combinations, they represents the drive system's retard envelope. It is desirable to operate the vehicle V as close as possible to the limits of this envelope, because it allows a higher average vehicle speed (and reduced trip times) without increasing wear on the vehicle's friction braking system. In order to facilitate operation close to the retard envelope limits with high confidence, the controller 26 may be used to provide the vehicle V with a temporary boost in retard effort when necessary.

In order to accomplish this function, during retard operation, the controller 26 determines the actual retard effort being applied and compares this to the retard envelope. This comparison may be accomplished, for example, by using a software algorithm to examine vehicle acceleration and retard power and plot vehicle speed within the retard envelope. If the retard envelope is exceeded, for example if maximum continuous retard effort is applied, yet the vehicle speed continues to increase, the controller 26 increases the retard effort being applied beyond the continuous limit, in order to further decelerate the vehicle V. The increased retard effort is held until the vehicle V is back within the normal retard envelope, by a predetermined margin. The magnitude of the margin is selected such that the final vehicle speed is low enough that a reduced level of retard effort will maintain the vehicle's speed, while simultaneously permitting thermal recovery of the retard system.

Like the torque boost described above, the increased retard usage may be limited in various ways to ensure that drive system life is not adversely affected. For example, the boost could be limited by amount of time per boost application, or minimum time between applications. The controller 26 may store a record of when, how long, and/or to what degree the additional retard effort is applied. This information may be used to adjust vehicle usage fees or maintenance fees contract adjustment based on utilization.

The control system and method described herein has numerous advantages over prior art vehicle drive systems. During propel operation, the vehicle V will have matched power to weight ratio for each load. This will reduce the performance variation from vehicle to vehicle and load to load—therefore reducing the tendency of vehicles to bunch up behind the slowest vehicle. This allows the engine/drive system combination to operate at the most efficient point as opposed to a driver trying to regulate speed following a vehicle ahead and going on and off the throttle, wasting fuel. When full engine power is not required, the drive system can lower engine speed as allowed to still provide the necessary power. It also reduces the stress/temperature excursion on engine components. Temporarily boosting torque output when needed can give the vehicle extra tractive effort to get unstuck when necessary, but limit reduction in component life by limiting applications. Finally, temporary boosting retard effort when needed allows an operator to drive at a higher speed closer to the edge of the retard envelope with confidence of not losing control. This Results in improved vehicle trip cycle time.

The foregoing has described a method for vehicle performance control. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A method comprising:
   determining a total vehicle weight that includes a weight of the vehicle and a weight of a load carried by the vehicle; and
   using an electronic controller carried by the vehicle, accepting a driver command for power output from a drivetrain of the vehicle that includes a prime mover operatively connected to at least one tractive element, and in response to the driver command, causing the prime mover to apply power to the at least one tractive element so as to propel the vehicle, wherein a magnitude of total power supplied to the at least one tractive element of the vehicle is proportional to the total vehicle weight and is limited by the electronic controller to a predetermined ratio of power per unit of the total vehicle weight regardless of a magnitude of the driver command, the predetermined ratio being substantially lower than a ratio of a maximum power available from the prime mover divided by the weight of the vehicle without the weight of the load,
   wherein the vehicle is included in a sequence of plural vehicles having different maximum powers and traveling together in a trip, and wherein the predetermined ratio of power per unit of the total vehicle weight is determined using at least one electronic controller carried by at least one of the vehicles and for the vehicle having at least one of a smallest maximum power or heaviest total vehicle weight and is used to limit the magnitudes of the total powers supplied by the vehicles in the sequence.

2. The method of claim 1 wherein the prime mover is coupled to drive a power source, at least one traction motor is electrically coupled to the power source, and the traction motor is coupled to the at least one tractive element.

3. The method of claim 1 wherein the predetermined ratio of power is determined by a dispatcher located remote from the vehicle and transmitted to the electronic controller.

4. The method of claim 1 further comprising controlling the drivetrain of a plurality of vehicles so that the vehicles travel at substantially equal speeds.

5. The method of claim 1 wherein the power is modulated so as to maintain a substantially constant vehicle speed.

6. The method of claim 5 wherein the substantially constant speed is substantially lower than a maximum speed of the vehicle when the vehicle is empty of the load.

7. The method of claim 1 wherein the total vehicle weight is determined by a payload sensor carried by the vehicle.

8. The method of claim 1 wherein the total power is temporarily boosted responsive to receiving a boost command communicated from a dispatcher located remote from the vehicle.

9. The method of claim 8 further comprising storing a record of a number of times the boost command is received.

10. A system comprising:
an electronic controller operably connected to at least one electric traction motor of a vehicle that is coupled to at least one tractive element and a power source that is coupled to a prime mover, the controller configured to:
determine a total vehicle weight that includes a weight of the vehicle and a weight of a load carried by the vehicle;
accept a driver command for power output, and in response to the driver command, cause the traction motor to apply power to the tractive element so as to propel the vehicle, wherein a magnitude of total power supplied to the at least one tractive element of the vehicle is proportional to the total vehicle weight and is limited to a predetermined ratio of power per unit of the total vehicle weight regardless of a magnitude of the driver command, the predetermined ratio being substantially lower than a ratio of a maximum power available from the prime mover divided by the weight of the load,
wherein the vehicle is included in a sequence of plural vehicles having different maximum powers and traveling together in a trip, and wherein the controller is configured to determine the predetermined ratio of power per unit of the total vehicle weight for the vehicle having at least one of a smallest maximum power or heaviest total vehicle weight and is used to limit the magnitudes of the total powers supplied by the vehicles in the sequence.

11. The system of claim 10 wherein the predetermined ratio of power is received by the controller from a dispatcher located remote from the vehicle.

12. The system of claim 10 further including a payload meter carried by the vehicle and operatively coupled to the controller.

13. The system of claim 10 wherein the controller is programmed to temporarily boost the total power supplied to the at least one tractive element in response to receiving a boost command.

14. The system of claim 13 wherein the controller is programmed to store a record of a number of times that the boost command is received.

15. The system of claim 10 wherein the at least one traction motor is coupled to an electric energy absorbing device and the controller is further programmed to:
cause the at least one traction motor to apply a predetermined baseline retarding force to the at least one tractive element;
determine a speed of the vehicle with reference to a retard envelope;
in response to the speed exceeding one or more boundaries of the retard envelope, apply an increased retarding force to the at least one tractive element; and
when the speed has returned to within the boundaries of the retard envelope, reduce the retarding force to the predetermined baseline retarding force.

16. The method of claim 1 wherein the predetermined ratio of power per unit of the total vehicle weight is determined for each of the vehicles using electronic controllers carried by the vehicles and using a maximum power output and the total vehicle weight of each vehicle, the predetermined ratios of power per unit of the total vehicle weights determined so that the vehicles travel at substantially equivalent speeds during the trip.

17. The method of claim 1, further comprising:
determining when operation of the vehicle requires that the total power supplied to the at least one tractive element exceeds the predetermined ratio of power per unit of the total vehicle weight; and
temporarily boosting the total power supplied to the at least one tractive element above the predetermined ratio of power per unit of the total vehicle weight until the operation of the vehicle no longer requires that the total power supplied to the at least one tractive element exceeds the predetermined ratio of power per unit of the total vehicle weight,
wherein temporarily boosting the total power supplied to the at least one tractive element includes temporarily increasing the total power in excess of the predetermined ratio of power per unit of the total vehicle weight.

18. The method of claim 1, further comprising:
determining when operation of the vehicle requires that the total power supplied to the at least one tractive element exceeds the predetermined ratio of power per unit of the total vehicle weight; and
temporarily boosting the total power supplied to the at least one tractive element above the predetermined ratio of power per unit of the total vehicle weight until the operation of the vehicle no longer requires that the total power supplied to the at least one tractive element exceeds the predetermined ratio of power per unit of the total vehicle weight,
wherein temporarily boosting the total power supplied to the at least one tractive element is limited to occurring only in one or more designated geographic areas.

19. The system of claim 10, wherein the controller is further configured to:
determine when operation of the vehicle requires that the total power supplied to the at least one tractive element exceeds the predetermined ratio of power per unit of the total vehicle weight; and
temporarily boost the total power supplied to the at least one tractive element above the predetermined ratio of power per unit of the total vehicle weight until the operation of the vehicle no longer requires that the total power supplied to the at least one tractive element exceeds the predetermined ratio of power per unit of the total vehicle weight,
wherein the controller is configured to temporarily boost the total power supplied to the at least one tractive element occurring only in one or more designated geographic areas.

20. The system of claim 15 wherein the boundaries of the retard envelope are determined from combinations of route grades and the weight of the load carried by the vehicle for a trip of the vehicle.

* * * * *